United States Patent Office 2,720,999
Patented Oct. 18, 1955

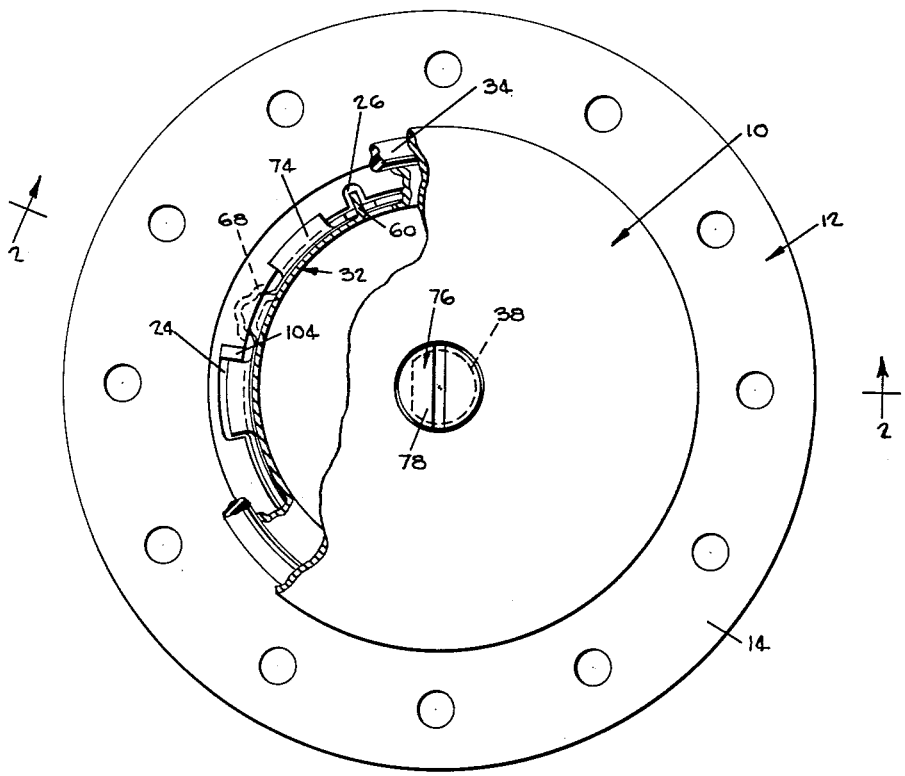
FIG_1
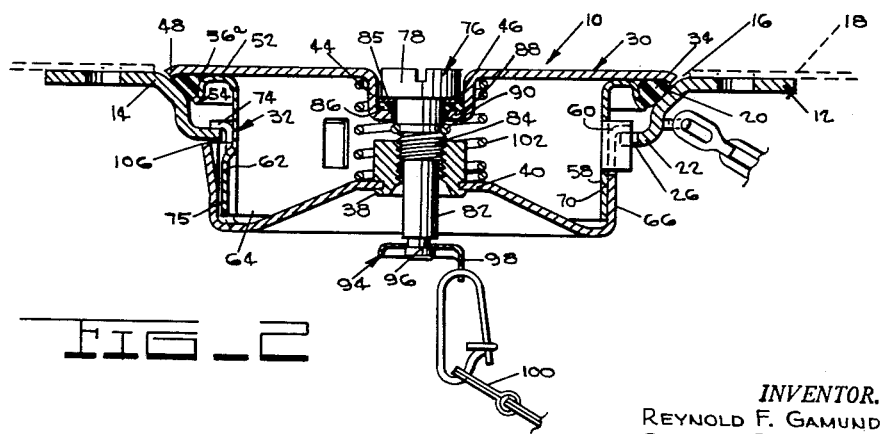
FIG_2
INVENTOR.
REYNOLD F. GAMUNDI
GEORGE R. PIPES
FREDERICK C. SCHWENDLER
BY
ATTORNEYS Oct. 18, 1955
R. F. GAMUNDI ET AL
2,720,999
FUEL CAP
Filed Oct. 9, 1952
3 Sheets-Sheet 2
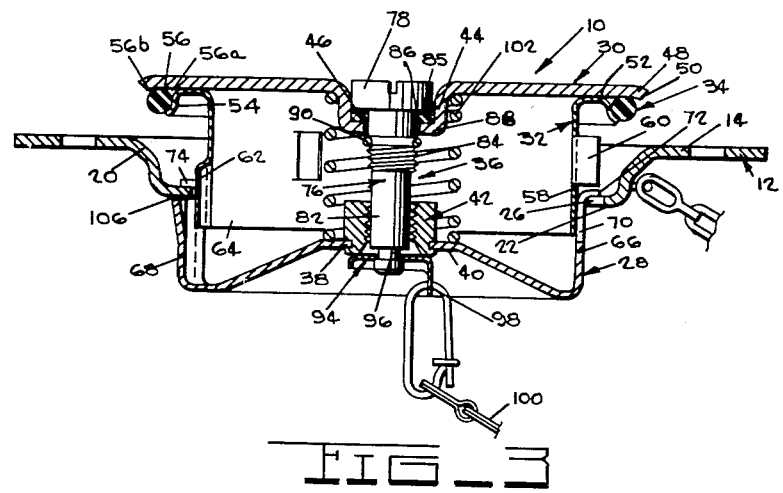
FIG_3
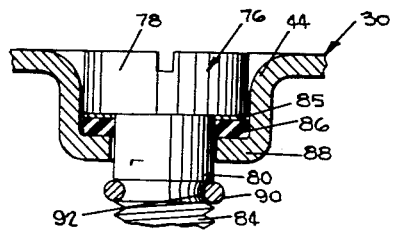
FIG_5
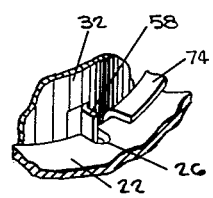
FIG_6
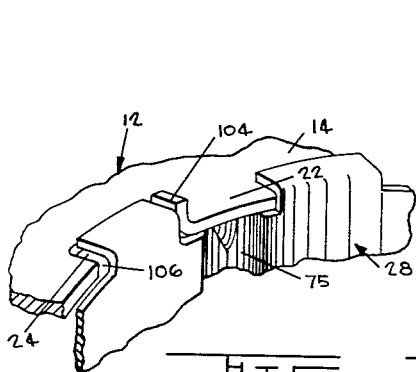
FIG_7
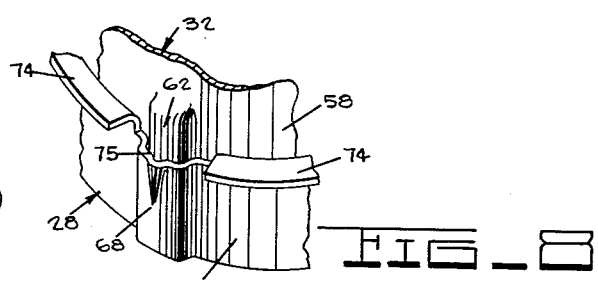
FIG_8
*INVENTOR.*
REYNOLD F. GAMUNDI
GEORGE R. PIPES
BY FREDERICK C. SCHWENDLER
*McDonald & Feagans*
ATTORNEYS

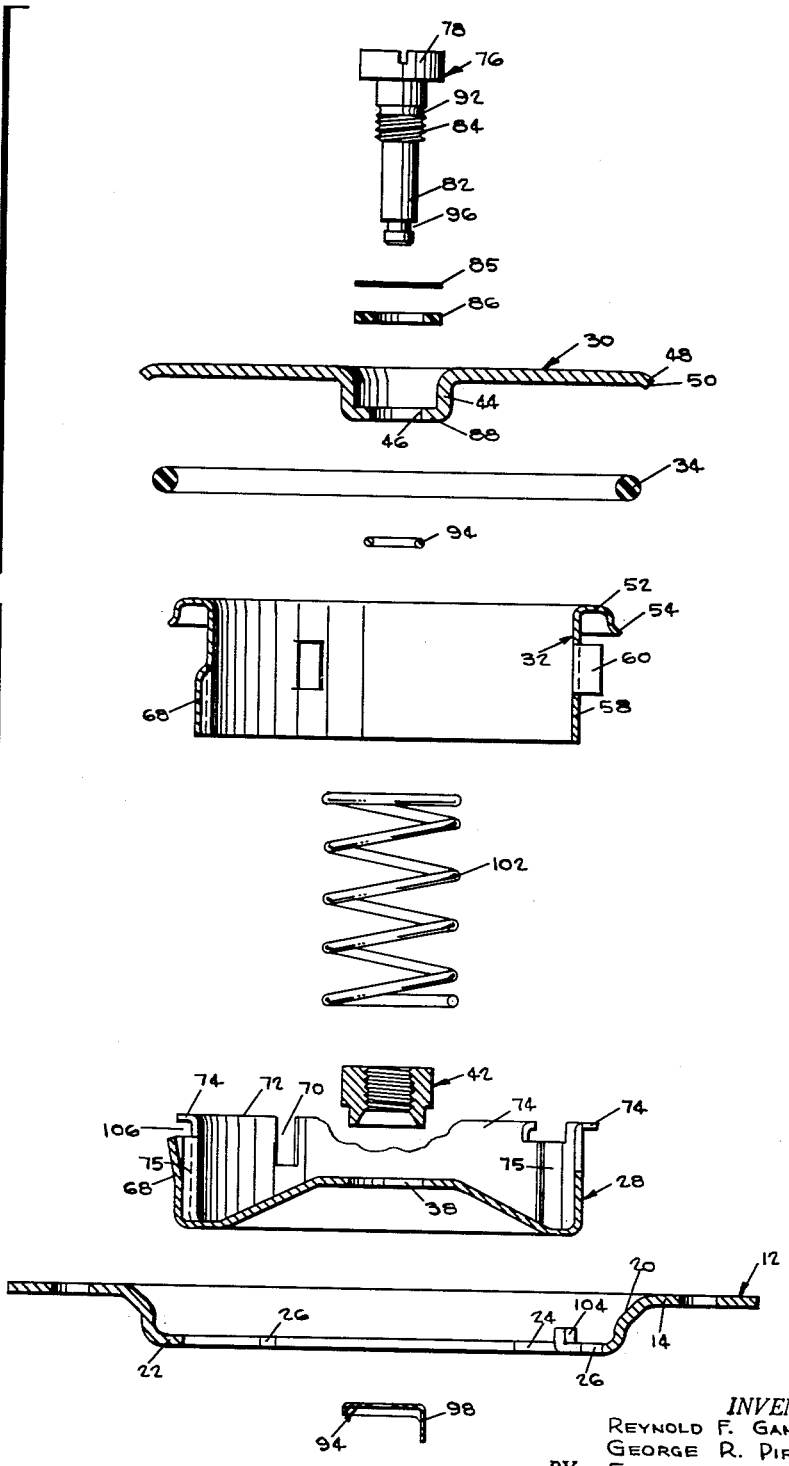

2,720,999

FUEL CAP

Reynold F. Gamundi and George R. Pipes, Mayfield Heights, and Frederick C. Schwendler, Cleveland, Ohio, assignors to Eaton Manufacturing Company, Cleveland, Ohio, a corporation of Ohio Application October 9, 1952, Serial No. 313,888

12 Claims. (Cl. 220—25)

This invention relates to closures and more particularly to caps for fuel containers and the like.

Broadly the invention relates to the provision of closures or caps for fuel tanks of aircraft and the like capable of effectively pressure sealing aircraft fuels within said tanks, upon the application thereof to appropriately designed cooperative filler necks for said tanks. It is essential that said caps perform both a locking and sealing action in the application thereof to filler necks of fuel containers to which adapted and further that a visual observation of the caps as applied foretells whether or not the caps are applied to the extent of performing a sealing action.

Among the objects of the invention is the provision of a fuel cap applicable to a filler neck of a fuel container, that:

a. Is effective to seal fuel under pressure in said containers;

b. Incorporates means for insuring both a cap locking and sealing means through a prescribed insertion and rotative application of the cap to the filler neck therefor;

c. Utilizes an O-ring seal which is axially compressibly engageable between sealing surfaces of the filler neck and cap;

d. Includes threaded means for effecting compression of sealing means therefor; and e. Includes means for freeing the cap from a frozen or ice bound condition in the desired removal of the cap from its container.

Other objects and advantages of the invention will appear from the following description taken in connection with the drawings forming a part of the specification, and in which:

Fig. 1 is a top elevation partly broken away and partly cross-sectionalized view of a closure and filler neck assembly;

Fig. 2 is a cross-sectional view taken substantially along lines 2—2 of Fig. 1;

Fig. 3 is a cross-sectional view similar to Fig. 2 but with the closure in only partly assembled relation in the filler neck;

Fig. 4 is an exploded view of the filler neck and closure of Figs. 1, 2 and 3 prior to the assembly of the various elements thereof;

Fig. 5 is an enlarged view of the connecting screw for the closure and the sealing arrangement therefor; and Figs. 6 through 8 are partly broken away perspective views of some of the interengaging elements of the closure and filler neck of Figs. 1, 2 and 3.

Similar reference characters indicate corresponding parts throughout the several views of the drawings.

This fuel container cap was devised primarily for use on expendable fuel tanks of military aircraft although it is equally adaptable for its intended use to other fluid containers. The cap includes cooperative parts which together with an appropriately designed filler neck provide for an initial bayonet locking of the cap to the filler neck upon rotative movement of the cap relative to the filler neck and upon subsequent relative axial movement of certain parts of the cap to each other and to the filler neck of the container together with a final screw thread connection an axially compressed annular seal is provided between the cap and filler neck of the container. If the sealing operation is not effected between the cap and filler neck of the container a visual observation thereof will be had in that parts of the cap will extend beyond the plane surface of the filler neck and thus indicate the necessity to effect this operation. This includes basically a member having appropriate tabs thereon receivable in complementary notches in a filler neck providing for a bayonet locking action therebetween, a second member supporting an O-ring seal, near its outer periphery, for axial compressive sealing relation against a portion of the filler neck, a spring biasing the members apart, and a screw and nut connection between the members for axially moving the members axially relative to one another. These basic elements of structure together with their proper designed interconnection and relation to the designed filler neck therefor provide the desired results in the applicational use thereof.

Referring to the drawings for more specific details of the invention 10 represents generally a cap or closure for application to a filler neck 12 of a fuel container, not shown.

The filler neck 12 in the form of a ring 14 is adapted to be fixedly secured in an opening 16 in a portion 18 of a fuel container. The ring 14 has a depressed central portion presenting a conical sealing surface 20 and an adjacent inner peripheral flange 22. The flange 22 has on its inner peripheral edge three equi-circumferentially spaced notches or slots 24 and three equi-circumferentially spaced notches or slots 26, equi-circumferentially spaced relative to the notches 24.

Cap 10 includes basically a dished member 28, a cover plate 30 having a sleeve 32 fixedly secured thereto, an O-ring seal 34 and a screw and nut assembly 36.

Dished member 28 has a D-shaped opening 38 centrally thereof providing a radially inwardly directed flange 40 with a D-shaped outer periphery nut or internally threaded member 42 received in the opening 38 and fixedly secured to the flange 40 near one axial end of the member 42. The D-shape of the opening 38 together with the complementary outer peripheral shape of member 42 provides for a non-rotative coupled relation of the members 28 and 42. Member 42 forms the nut element of the screw and nut assembly 36.

Plate 30 includes a depressed central portion 44 having a central opening 46 therethrough and a small offset outer peripheral flange 48 terminating in an annular angular surface 50.

Sleeve 32 includes an inverted annular U-shaped section 52 at one axial end providing an annular outer peripheral flange 54 which with the base of the U-shaped section is spot welded or otherwise fixedly secured to the underside of the plate near the flange 48, provides an annular channel or groove 56 within which the O-ring seal 34 is seated. Groove 56 as noted with the seal 34 seated therein provides annular clearance spaces 56a and 56b for movement of the seal thereinto when it is placed in sealing operation. The main body 58 of sleeve 32 has three equi-circumferentially spaced radially outwardly directed tabs or ears 60 stamped out of it, with said tabs being located axially intermediate the ends of the sleeve, and a radially outwardly directed and axially extending bulge or protrusion 62 formed thereon at the end 64 of the sleeve. The protrusion 62 is predeterminedly circumferentially spaced relative to one of the tabs 60. The tabs 60 have the same circumferentially spaced relation to one another as the notches 26 in the flange 22 of filler neck 12, the purpose of which will hereinafter appear.

Axially extended sleeve portion 66 of dished member 28 has three equi-circumferentially spaced radially outwardly directed and axially extended bulges or protrusions 68 formed thereon, three equi-circumferentially spaced relief notches or slots 70 at the free axial extremity 72 thereof and three equi-circumferentially spaced radially outwardly directed flanges 74 at the end of axial extremity 72. Recesses or grooves 75 are formed on the sleeve portion 66 of member 28 reversely of the protrusions 68, the purpose of which will hereinafter appear.

A screw 76 forming a part of screw and nut assembly 36 includes a slotted head 78 and a shank 80. The shank 80 of screw 76 is received in opening 46 and includes an unthreaded portion 82 received in the bore of the nut 42 and projecting axially therebeyond opposite from the threaded portion thereof and a threaded portion 84 adapted to have threading engagement with the threaded bore of nut 42. It is to be noted that because of the related size of unthreaded portion 82 to the bore of nut 42 that an effective guide is had for the screw permitting of ease in engaging the threads of the nut and screw when it is desired to draw the dish shaped member axially toward the plate. The head 78 of screw 76 is received in the central depression 44 of plate 30 with the underside thereof in engagement with a washer 85 which in turn axially abuts an annular seal 86 seated on a radial flange 88 of the depression 44.

A snap ring 90 is seated in an annular groove 92 on the shank of the screw intermediate the threaded portion 84 and head 78 of the screw and serves to engage the underside of flange 88 opposite from the seal 86, the purpose of which will hereinafter appear.

A combination annular screw retainer and chain bracket 94 is swivelingly secured in a groove 96 in the unthreaded portion 82 of the shank near the end extremity thereof, said retainer adapted to have end abutting engagement with one end of nut 42 opposite from head 78 of the screw to retain the major elements of the cap together as a unit.

An axially directed flange 98 on retainer 94 is provided with a hole in which is clipped one end of a chain 100 with the other end of the chain secured to the filler neck. As such the cap is so held as a part of the filler neck and container to which it is applied so as to prevent its accidental detachment therefrom.

The threaded portion 84 of screw 76 is of predetermined axial length such that with the threads of the screws 76 and nut 42 disengaged as shown by Fig. 3, the one end of the threaded portion is axially spaced from the one end of the threaded bore in the nut and wherein the retainer 94 engages the end of nut 42 on the opposite side thereof from the head 78 of the screw. This relationship of parts is so maintained under the biasing effect of spring 102 when no axial pressure is applied to either the screw or plate against the resistance of spring 102.

A coil spring 102, arranged in concentric surrounding arrangement to the nut 42, depressed portion 44 of plate 30 and screw 76, axially between plate 30 and dished member 28, serves to normally bias them axially apart, the purpose of which will hereinafter appear.

The cap 10 in its free non-applied state has the plate 30 and dished member 28 biased apart by the spring 102 with the sleeve 32 and dished member in fitted telescopic assembly wherein the protrusion 62 on the sleeve 32 fits into one of the grooves 75 in the dished member 28 and with the tabs 60 aligned with and axially spaced from the notches 70. As such this cooperative structure of the dished member 28 and sleeve 32 permits of axial relative movement therebetween as well as providing a driving connection inhibiting relative rotation therebetween.

In the application of cap 10 to filler neck 12, the equi-circumferentially spaced bulges 68 match with the equi-circumferentially spaced notches 24 and are received therein whereupon after the underside of flanges 74 engages the upperside of flange 22 the cap is rotated clockwise a predetermined amount until the leading edges of the flanges 74 engage stops or tabs 104 formed from flange 22 adjacent one end of notches 24. It is to be noted from Fig. 2 that the axial space 106 provided between the underside of flanges 74 and the one axial extremity of the bulges or protrusions 68 is substantially equivalent to the thickness of flange 22 so that a firm locking grasp is had between dished member 28 and the filler neck after its assembled rotation thereon. This initial assembly of the cap to the filler neck is illustrated by Fig. 3.

In rotating the cap to effect a bayonet locking action thereof to the filler neck, the plate 30, sleeve 32 and dished member 28 are moved as a unit whereupon as the leading edges of flanges 74 engage the tabls 104, the tabs or ears 60 on the sleeve 32 are rotated to a position so as to coincide with complementary notches 26 formed in flange 22 of ring 14 whereupon the notches 26 and 70 likewise coincide with one another.

With the cap bayonet locked to the filler neck a visual observation is had that the sealing operation has not been completed or is not in effect. To effect a sealing operation it is next necessary to collapse the cap, that is, move the plate 30 and joined sleeve 32 axially relative to dished member 28 whereby the tabs 60 are received in the slots 26 and 70 of the respective ring 14 and dished member 28. At the same tmie the bulge 58 moves axially in one of the grooves 75 formed on the reverse side of one of the bulges 68. As the plate 30 is advanced axially toward the dished member 28, the screw 76 is carried therewith whereupon the threads of the screw 76 and nut 42 engage axially. A subsequent rotation of the screw 76 through the application of a screw driver or appropriate tool in the slot of the screw causes a threading relation between the screw 76 and nut 42 resulting in drawing the plate 30 axially toward the dished member 28 with the O-ring seal 34 engaging the conical sealing surface 50. Simultaneously therewith the annular seal 86 is pressed firmly between the head 78 of screw 76 and the plate 30 providing for an effective sealing therebetween. As the screw is threaded down to the desired amount the seal 34 is compressed between the plate 30 and ring 14 to provide an effective sealing of the opening in the fuel container capable of withstanding pressure on the fuel so contained. As noted from Fig. 2 the seal 34 is distorted to occupy space 56b and a portion of 56a in its confined sealing position between plate 30, sleeve 32 and surface 20 of ring 14. The remaining portion of space 56a permits of further movement of the seal 34 thereinto should it swell. The effective confinement provided for seal 34 between plate 30, sleeve 32 and ring 14 insures effective sealing and restrains the seal from displacement therefrom. Simultaneously with the sealing operation, the dished member is firmly and securely held in bayonet locking position on the filler neck through the axial impingement of the axial ends of the bulges 68 against the underside of flange 22 of the filler neck.

During the rotative threading of the screw 76, the retainer 94 being loosely secured to the end thereof does not rotate therewith but maintains a substantially constant relation to chain 100. It is to be noted in the axial movement of plate 30 by way of the head of screw 76 impinging on washer 85 which in turn presses against seal 86 and with the seal in turn engaging plate 30 that in overcoming the resistance of coil spring 102 the seal 86 is compressed between the plate 30 and head of screw 76 and thus pressure seals the opening 46 in plate 30. Because of the use of washer 85 the seal 86 is effectively compressed without its being distorted since rotation occurs between the abutting surfaces of head 78 of screw 76 and washer 85.

With the completion of both the bayonet locking and sealing operation between the cap 10 and filler neck 12, the cap is in operative position to seal fuel under pressure in the tank or container to which applied and safe from accidental release from sealed and locked engagement on the filler neck. The plate 30 together with the screw 76 are so related in assembly and shape to one another and the wall of the container in which the filler neck is fixedly secured whereby a substantially continuous smooth surface of planar nature is provided which in the case of aircraft or the like offers no resistance to or interferes in any way with a smooth air flow thereover.

When it is desired to remove the cap 10 from sealing and locking relation to the filler neck 12, a screw driver or other appropriate tool is placed in engagement with the slot in the head 78 of screw 76 to provide for the rotative movement thereof. Under normal weather conditions wherein no ice or snow accumulates on the cap and between the cap and filler neck and container, an unthreading of the screw 76 from the nut results in coil spring 102 biasing the plate 30 axially away from the dished member 28 whereupon the sealing operation between the cap and filler neck is disrupted. After the screw is completely threaded from the nut the plate 30 together with screw 76 and sleeve 32 literally pops up by virtue of the force of spring 102. It is then only necessary that the cap, sleeve and dished member be rotated counter-clockwise as a unit, through the medium of their coupled relation, effective to release the bayonet locking action of the dished member upon the filler neck. The cap can then be retracted from the opening in the filler neck and moved to one side thereof permitting of the inspection or replenishment of fuel in the container.

In the case of the accumulation of ice or snow upon the exposed portion of plate 30, screw 76, the filler neck 12, and wall of the container to which the cap is applied, it is only necessary initially to clear the obstruction from the screw so as to once again expose the slot in the screw so as to permit of the insertion of an appropriate tool therein for the rotation thereof. Thus as the screw 76 is rotated to effect an unthreading thereof from nut 42, it is forced axially away from the nut and serves to further break the obstruction around the screw and cause the head of the screw to project beyond the outer plane surface of plate 30. This amount of outward axial relative movement of the screw to the plate is limited to the predetermined axial distance between snap ring 90 and the underside of flange 88 of the plate 30. After the screw is unthreaded an amount to bring the snap ring 90 into engagement with the plate 30, a further unthreading of the screw serves to exert an axial thrust against the plate 30 in addition to the load of spring 102 which in most cases is ample to free the plate 30 from ice or snow bound connection to the filler neck and container. The screw is next completely unthreaded from the nut permitting the plate, screw and sleeve to pop up, whereupon the cap can be rotated to release it from bayonet locked relation on the filler neck.

It will be appreciated that wherein pressure has built up in the container to which the cap is applied, a safety feature is had in that upon unthreading of the screw from the nut pressure in the container bleeds out to a safe level before the cap is rotated for complete removal. This feature prevents cap blow-out which might occur if the two step opening arrangement were not provided.

While this invention has been described in connection with certain specific embodiments, the principle involved is susceptible of numerous other applications that will readily occur to persons skilled in the art. The invention, therefore, is limited only as indicated by the scope of the appended claims.

What we claim is:

1. A closure for fluid containers comprising a circular plate, a tubular sleeve arranged coaxially of the plate and secured thereto, a dish shaped member having the sleeve telescoped therein, spring means interposed axially between the plate and dish shaped member biasing them apart, means securing the dish shaped member and plate together against the resistance of the spring means including a screw threaded assembly for drawing the members axially toward one another, and interengaging means on the sleeve and dish shaped member permitting axial and preventing rotative movement between them, said means securing the plate and dish shaped member together including an internally threaded nut fixedly secured to the dish shaped member and an externally threaded member, supported on the plate, adapted to be engageable with the internally threaded member secured on the dish shaped member, and means fastened near one end of the externally threaded member for limiting its axial movement away from the dish shaped member, said dish shaped member having a plurality of equi-circumferentially spaced protrusions in its external periphery and a plurality of equi-circumferentially spaced slots, said sleeve having a like number of equi-circumferentially spaced outward radially directed tabs adapted to be received in the slots in the dish shaped member and said interengaging means including an axial groove or recess in the dish shaped member and a protrusion on the external periphery of the sleeve received in the groove in the dish shaped member.

2. A closure according to claim 1 wherein an annular seal is supported between portions of the sleeve and plate near the external periphery of the plate.

3. A closure according to claim 1 wherein the externally threaded member includes an unthreaded portion projecting axially through the dish shaped member and to which the means for limiting the axial movement of the externally threaded member away from the dish shaped member is loosely fastened.

4. A closure according to claim 3 wherein the plate has a depressed portion and a central opening in the depressed portion, wherein the externally threaded member of the means securing the plate and dish-shaped member together includes a head received in the depressed portion and the threaded and unthreaded portions of the externally threaded member are received through the central opening in the depressed portion of the plate, and wherein means are secured to the external periphery of the externally threaded member intermediate the threaded portion and head of the member engageable with one axial surface of the depressed portion of the plate and the underside of the head of the member, is engageable with the opposite axial surface of said depressed portion.

5. A closure according to claim 4 wherein retainer means are secured near the extremity of the member, of the means, engageable with one axial end of the internally threaded member.

6. A closure according to claim 5 wherein the axial length of the threaded portion of the member, of the means, is less than the axial distance the plate and dish shaped member can be axially biased apart.

7. A closure according to claim 6 wherein the spring means is in the form of a coiled spring concentrically arranged to the member, of the means.

8. A closure for fluid containers comprising a plate, a sleeve fixedly secured to the plate in coaxial relation thereto, a dish shaped member, means projecting centrally through the plate and dish shaped member coupling them together, spring means interposed axially between the plate and dish shaped member biasing them apart, and an internally threaded member fixedly secured to the dish shaped member, said means including a member having an externally threaded portion and a coaxial unthreaded portion received in the internally threaded portion with the externally threaded portion adapted to have screw thread relation with the internally threaded portion, said dish shaped member having a plurality of equi-circumferentially spaced protrusions on its external periphery, an axial recess and a plurality of equi-circumferentially spaced axial slots and said sleeve having a protrusion on its external periphery slidable in the recess in the dish shaped member and a plurality of equi-circumferentially spaced outward radially directed ears on its external periphery equal in number to the slots in the dish shaped member slidable in the slots in the dish shaped member.

9. A closure according to claim 8 in combination with a filler neck of a fluid container wherein the filler neck has a central opening for receipt of the closure therein, a plurality of equi-circumferentially spaced slots in its inner periphery of equal number to the protrusions on the dish shaped member for receipt of the protrusions therein, and a plurality of equi-circumferentially spaced slots in its inner periphery equi-circumferentially spaced relative to the first mentioned slots therein, equal in number to the slots in dish shaped member and the ears in the sleeve for receipt of the ears therein, and wherein an annular seal is provided for annular engagement between the plate and filler neck.

10. A closure according to claim 9 wherein the dish shaped member has radially outwardly directed flange means on one end thereof axially engageable with the filler neck near the inner periphery thereof.

11. A closure comprising a plate having a central depressed portion and an opening centrally through the depressed portion, a sleeve fixedly secured to and coaxially arranged relative to the plate extending axially away from the plate in the same direction as the depressed portion, a dish shaped member including integral sleeve and plate portions, said dish shaped member having a central opening in the plate portion thereof coaxial with the central opening in the plate, a plurality of equi-circumferentially radially outwardly directed projections on the external periphery of the sleeve portion thereof, an axial groove in the internal periphery of the sleeve portion thereof, a plurality of equi-circumferentially spaced notches in the sleeve portion thereof extending from the end of the sleeve portion axially opposite from the plate portion, and radially outwardly directed flange means on the end of the sleeve portion circumferentially between the slots, said sleeve having a radially outwardly directed projection on the external periphery thereof received in the groove of the sleeve portion of the dish shaped member with the external periphery of the sleeve received in telescopic adjacent relation to the internal periphery of the sleeve portion of the dish shaped member, and a plurality of equi-circumferentially spaced radially outwardly directed projections of equal number and like circumferential spacing to the notches in the sleeve portion of the dished member for receipt therein, an annular seal seated in the depressed portion of the plate on the axial surface thereof, opposite from the securement of the sleeve to the plate, in surrounding relation to the opening in the plate, an internally threaded member fixedly secured to the dish shaped member in the central opening of the plate portion thereof, a screw including a head and a shank with the shank having an unthreaded axial portion and an externally threaded portion complementary in size to the internally threaded member for threading engagement therewith, said screw having its shank projecting concentrically through the opening in the plate and the threaded bore of the internally threaded member with the head received in the depressed portion of the plate with its underside adjacent to the annular seal, a snap ring secured to the shank of the screw intermediate the head and threaded portions of the screw and disposed axially between one end of the internally threaded member and the axial surface of the plate upon which the sleeve is secured, a retainer loosely mounted on the unthreaded portion of the shank near its free extremity serving to limit the axial distance the plate and dish shaped member can be moved apart, a coil spring biasing the plate and dish shaped member apart, said threaded portion of the shank of the screw having an axial length less than the relative axial movement between the plate and dish shaped member, said snap ring being engageable with the axial surface of the plate on which the sleeve is secured prior to the disengagement of threading relation between the screw and nut when the plate is in axial compressed position relative to the dish shaped member, and an annular seal supported between portions of the sleeve and plate on the axial surface of the plate to which the sleeve is secured near the external periphery of the plate.

12. A closure according to claim 11 in combination with a fluid container filler neck wherein the filler neck has a central opening therethrough for receipt of the closure therein, an inward radially directed flange adjacent the opening, an outward radially directed flange and a conical surfaced annular portion interconnecting the flanges for engagement with the annular seal supported between the plate and sleeve, said inward radially directed flange having a plurality of equi-circumferentially spaced notches on its internal periphery of equal spacing and like number to the projections on the dish shaped member for receipt of the projections therein and a plurality of equi-circumferentially spaced notches equi-circumferentially spaced relative to the first notches in the flange and of equal spacing and like number to the projections on the sleeve for receipt of the projections therein.

References Cited in the file of this patent

UNITED STATES PATENTS

| | | |
|---|---|---|
| 596,612 | North | Jan. 4, 1898 |
| 2,188,735 | Grundstrom | Jan. 30, 1940 |
| 2,416,637 | Minella | Feb. 25, 1947 |
| 2,465,727 | Jensen | Mar. 29, 1949 |
| 2,488,796 | Baier | Nov. 22, 1949 |

FOREIGN PATENTS

| | | |
|---|---|---|
| 5,270 | Great Britain | A. D. 1890 |
| 17,795 | Great Britain | A. D. 1896 |
| 139,064 | Great Britain | Feb. 26, 1920 |